(12) United States Patent
Fenelon et al.

(10) Patent No.: US 9,862,832 B2
(45) Date of Patent: Jan. 9, 2018

(54) METHOD OF MAKING COLORED SAND COMPOSITION

(71) Applicant: Mix Manufacturing, Inc., St. Paul, MN (US)

(72) Inventors: Kevin M. Fenelon, St. Paul, MN (US); Terrance P. Fenelon, Mendota Heights, MN (US)

(73) Assignee: Mix Manufacturing, Inc., St. Paul, MN (US)

( * ) Notice: Subject to any disclaimer, the term of this patent is extended or adjusted under 35 U.S.C. 154(b) by 281 days.

(21) Appl. No.: 14/743,109

(22) Filed: Jun. 18, 2015

(65) Prior Publication Data

US 2016/0369102 A1 Dec. 22, 2016

(51) Int. Cl.
C09C 1/30 (2006.01)
C09D 133/04 (2006.01)
C09D 133/08 (2006.01)
C09D 131/04 (2006.01)

(52) U.S. Cl.
CPC ............ *C09C 1/309* (2013.01); *C09D 131/04* (2013.01); *C09D 133/04* (2013.01); *C09D 133/08* (2013.01); *C09C 1/3054* (2013.01); *C09C 1/3072* (2013.01)

(58) Field of Classification Search
CPC ...... C09C 1/309; C09C 1/3072; C09C 1/3054
See application file for complete search history.

(56) References Cited

U.S. PATENT DOCUMENTS

| 1,233,501 A | 7/1917 | Cotter |
| 2,001,448 A | 5/1934 | Beasley |
| 5,264,029 A | 11/1993 | Kviesitis |
| 5,583,165 A | 12/1996 | Kviesitis |
| 6,338,871 B1 | 1/2002 | Shin |
| 6,884,509 B2 | 4/2005 | Huff et al. |
| 7,258,922 B2 | 8/2007 | Hesse et al. |
| 7,563,316 B2 | 7/2009 | Krauter et al. |
| 7,858,148 B2 | 12/2010 | Reddick |
| 8,034,429 B2 | 10/2011 | Huff et al. |
| 8,263,203 B2 | 9/2012 | Reddick |
| 2006/0257643 A1* | 11/2006 | Birger ...................... C09C 1/30 428/323 |
| 2007/0062416 A1 | 3/2007 | Brzuskiewicz et al. |
| 2008/0261007 A1* | 10/2008 | Hong .................... E04D 7/005 428/216 |

FOREIGN PATENT DOCUMENTS

| GB | 1481416 A * | 7/1977 | ......... B29C 47/0004 |
| JP | 11315520 A * | 11/1999 | |
| WO | WO 2011150637 A1 * | 12/2011 | ........... C09C 1/3072 |

OTHER PUBLICATIONS

Derwent Abstract of HU 200700615 A1, 2010.*
Machine translation of JP 11-315520 A, Aug. 2017.*

* cited by examiner

*Primary Examiner* — Nicole Buie-Hatcher
(74) *Attorney, Agent, or Firm* — Holzer Patel Drennan

(57) ABSTRACT

Colored polymeric sand that is made by mixing a pigment onto sand to form colored sand, applying an acrylate-based polymeric coating on the colored sand, drying the acrylate-based polymeric coating, and applying a second polymeric material on the dried acrylate-based polymeric coating. The second polymeric material can have an ingredient (e.g., coating) that is water soluble. The resulting colored sand product can be used, for example, between pavers.

18 Claims, 3 Drawing Sheets

METHOD OF MAKING COLORED SAND COMPOSITION

BACKGROUND

To increase the aesthetic appeal, and also value of their property, home owners and other property owners often spend a lot of time and money on landscaping and hardscaping. Cement and stone pavers are a common sidewalk, driveway, and patio material. After the pavers are laid, the gaps between adjacent pavers are filled with sand to increase the lock between pavers and to stabilize the pavers.

SUMMARY

Such paver sand can be either mixed with a small amount of polymeric material or coated with a polymeric material. The polymeric material increases the locking nature of the sand, holding the pavers better than sand without any polymeric material. There is a desire to have pigmented polymeric sand that can be matched or contrasted to the paver color, to modify the aesthetic appeal of the sidewalk, driveway, patio or other hardscape. Various embodiments of colored, polymeric coated sand and methods of making the sand are provided in this disclosure.

In general, the colored sand is produced by applying pigment (e.g., dry particulate pigment or a liquid pigment dispersion) to sand, applying a polymeric binder, e.g., an acrylic, to the sand, and then drying the colored-binder-coated sand. A second polymeric coating, e.g., copolymer of vinyl acetate and ethylene, is applied over the colored coating. This second polymeric coating is formed from a dry particulate or powdered polymeric material. After the colored sand product is applied, e.g., to a crack or joint between pavers, water or other liquid can be applied (e.g., sprayed) onto the sand to increase the adhesion between the sand particles and thus lock the sand.

One particular implementation described herein is a method that includes mixing a pigment onto wetted sand to form colored sand, applying a first polymeric coating on the colored sand, drying the first polymeric coating, and applying a second polymeric coating on the dried first polymeric coating. The first polymeric coating can be, e.g., an acrylate or an acrylic, and the second polymeric coating can be, e.g., a copolymer of vinyl acetate and ethylene.

Another particular implementation described herein is a method that includes mixing a liquid pigment having a first polymeric binder onto sand to form colored sand, drying the colored sand, and applying a second polymeric coating on the dried colored sand. The first polymeric binder can be, e.g., an acrylate or an acrylic, and the second polymeric coating can be, e.g., a copolymer of vinyl acetate and ethylene. The sand may be wetting prior to mixing with the liquid pigment.

In one implementation, the resulting colored sand comprises a base particle, a plurality of pigment particles adhered to the base particle by a first polymeric material (e.g., an acrylate or an acrylic), and a second polymeric material (e.g., a vinyl acetate and ethylene copolymer, optionally comprising a water soluble component) at least partially coating the first polymeric material.

After the colored polymeric sand has been placed, e.g., between pavers, the sand can be wetted, e.g., sprayed with water, packing and locking the sand together. If a water soluble component is present in or on the polymeric material, the water softens and dissolves the water soluble component, thus exposing the second polymeric material, which can then adhere adjacent sand particles together, further increasing the packing and locking of the sand.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

BRIEF DESCRIPTIONS OF THE DRAWING

The described technology is best understood from the following Detailed Description describing various implementations read in connection with the accompanying drawings.

DETAILED DESCRIPTION

In order to solidly lock together pavers, polymeric sand (i.e., sand having a polymeric coating on its surface) is placed (in the cracks or joints) between adjacent pavers. To modify the look of the overall project, the polymeric sand is provided with a pigment to modify the color from the original sand color. The present disclosure provides a colored polymeric sand that is easily made by the methods of this disclosure. Prior to these methods, colored sand products had inconsistent colors and/or were difficult to produce.

In the following description, reference is made to the accompanying drawing that forms a part hereof and in which are shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Figure 1:
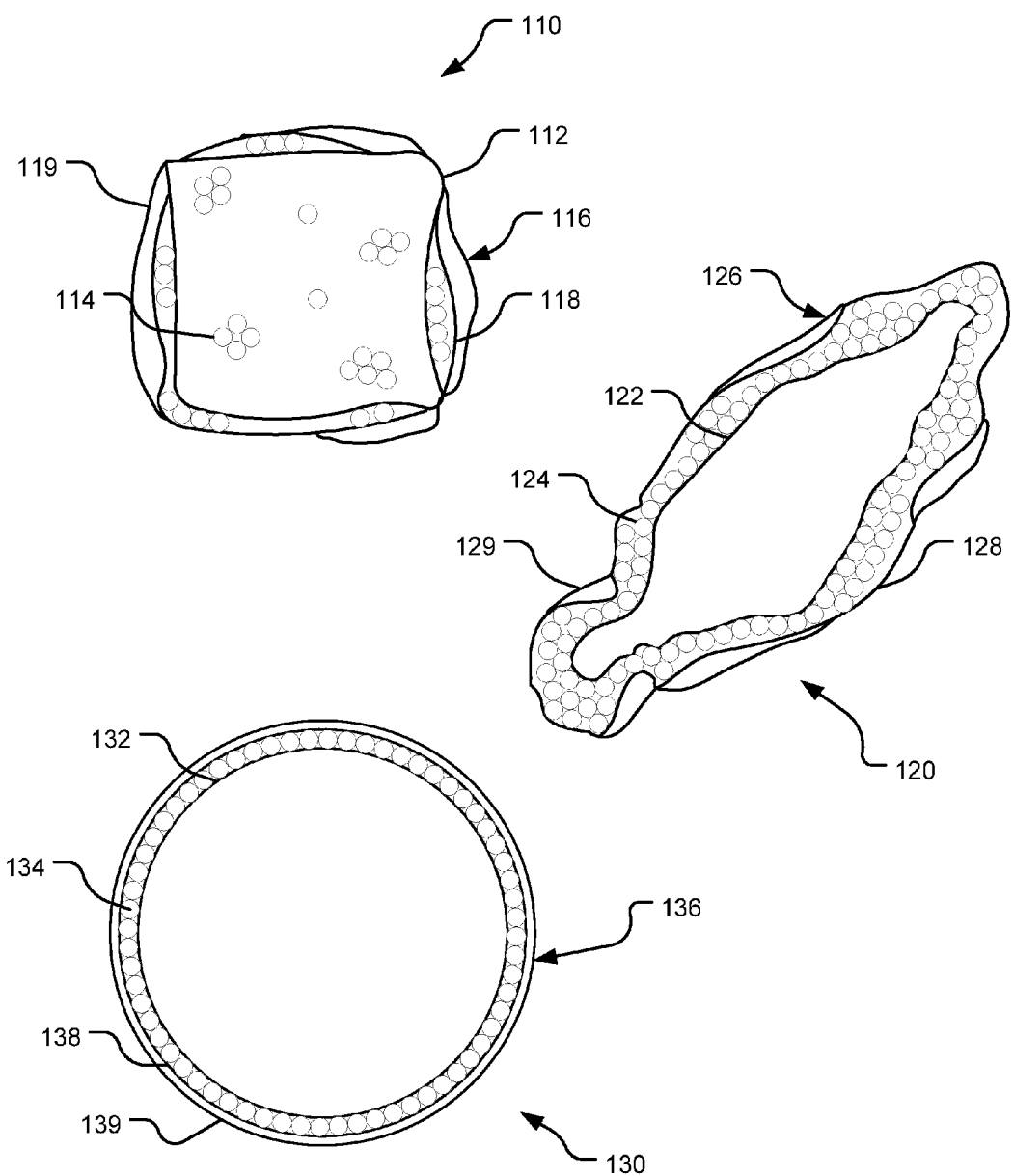
FIG. 1 is a schematic view of several grains of colored polymeric sand.

FIG. 1 illustrates several grains of sand each having a pigment and a polymeric material thereon. These illustrated grains are examples of colored polymeric sand and are not limiting of the disclosed and claimed invention, but are shown as examples of colored polymeric sand made by the methods of this disclosure. Features from one grain may be interchanged with, added to, or combined with features of another grain.

A first coated sand grain 110 has a base particle 112, which is a blocky sand particle. Present on the base particle 112 is a plurality of pigment particulates 114, which are sporadically and irregularly found on the surface of the base particle 112. A polymeric material 116 is present as a thin coating over the pigment particulates 114 and the base particle 112. The polymeric material 116 includes a first polymeric material 118 and a second polymeric material 119 at least partially covering at least some of the first polymeric material 118. In this embodiment, the pigment particles 114 do not cover the entire surface of the base particle 112, but rather, portions of the surface are uncoated with the pigment particles 114. Similarly, the polymeric material 116 does not cover the entire surface of the base particle 112, but rather, portions of the surface are uncoated with the polymeric material 116. In some areas, the polymeric material 116 is directly on the base particle 112 rather than on pigment particles 114.

A second coated sand grain 120 has a base particle 122, which is an angular, irregularly shaped sand particle; such a base particle 122 may have been crushed or otherwise processed to provide the angular, irregular shape. Present on the base particle 122 is a plurality of pigment particulates 124, which completely cover the surface of the base particle 122. A polymeric material 126 is present as a thin coating over the pigment particulates 124 and the base particle 122. The polymeric material 126 includes a first polymeric material 128 and a second polymeric material 129 at least partially covering the first polymeric material 128. In this embodiment, the pigment particles 124 are present as an irregular thickness coating, which a monolayer in some areas and multiple layers on other areas.

A third coated sand grain 130 has a base particle 132, which is a fairly smooth, spherical sand particle, with little or no surface porosity. Alternately, the base particle 132 could be a glass bead. Present on the base particle 132 are a plurality of pigment particulates 134, which completely cover the surface of the base particle 132 as a monolayer. A polymeric material 136 is present as a thin coating over the pigment particulates 134 and the base particle 132. The polymeric material 136 includes a first polymeric material 138 and a second polymeric material 139 fully covering the first polymeric material 138 and the particles 132.

A colored polymeric sand product can be formed from any or all of the coated sand grains 110, 120, 130, in any amount. For example, a colored polymeric sand product could be composed of a combination of blocky coated sand grains 110 and angular coated sand grains 120, at a ratio of, e.g., 40:60 to 60:40. As another example, a colored polymeric sand product could be composed of a combination of blocky coated sand grains 110, angular coated sand grains 120, and spherical sand grains 130, at a ratio of, e.g., 33:33:33. As yet another example, a colored polymeric sand product could be composed of only one type of coated sand grains, e.g., blocky coated sand grains 110, or angular coated sand grains 120.

The colored polymeric sand product can be produced and packaged for use by commercial hardscape installers or by (residential) do-it-yourselfers. The product can be available through, e.g., garden centers, landscape supply wholesalers, and home improvement stores. As an example, the colored polymeric sand product can be packaged in 40 or 50 pound bags, suitable for use by both commercial installers and do-it-yourselfers, or in bulk super sacks, which are weighed in tons.

The colored polymeric sand product is produced by applying pigment (e.g., dry particulate pigment or a liquid pigment dispersion) to sand, applying a polymeric binder to the colored (wet) sand, and then drying the colored polymeric-coated sand. A second polymeric coating is applied over the dried first polymeric coating.

Figure 2:
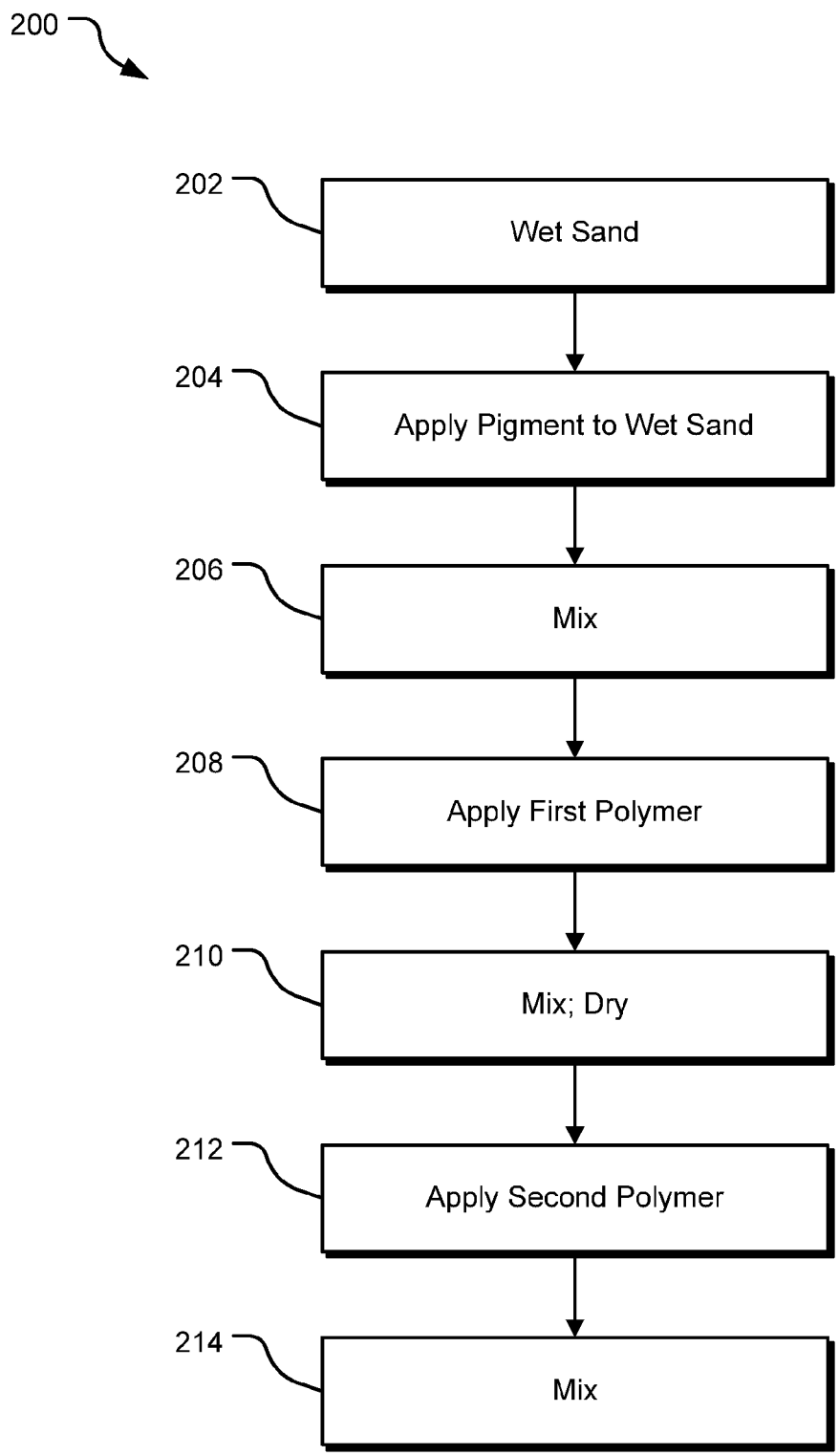
FIG. 2 is a flow diagram of an exemplary method of making colored polymeric sand.

FIG. 2 illustrates an exemplary process 200 for forming colored polymeric sand. In operation 202, wetted or dampened sand is provided; the sand may be obtained wet or dry sand may be wetted. The sand is predominantly silica although other materials may be present. The sand may be blocky, angular and/or irregular, spherical, or have another shape or configuration. The sand may or may not have surface porosity. The sand may be screened and/or washed, for example, to remove fines and dust. The sand may be tightly graded by size, or may have a broad particle size distribution. Different grades (sizes) of different base sand particles may be combined, at various ratios. The sand is preferably at a temperature of 50 degrees or more.

To obtain wetted or dampened sand from dry sand, a liquid (typically water) is applied to the sand, such as by spraying, misting, or merely by pouring the liquid on to or in the same vessel as the sand. The liquid may be added slowly over time or may be added as a single addition (as a batch). The amount of liquid on the sand may be, for example 0.1 to 5 wt-% of the dry sand, in some embodiments, 0.25 to 2 wt-% or 0.25 to 1 wt-%. The liquid is preferably evenly distributed throughout the sand particles, which can be done by mixing (e.g., tumbling) the sand during or after addition of the liquid to the sand.

In operation 204, pigment is added to the wetted or dampened sand. The pigment can be a (dry) particulate pigment or a liquid pigment, such as a dispersion, suspension or a solution. The amount of pigment added may be, for example, 0.05 to 5 wt-% of the dry sand, 0.1 to 2 wt-%, 0.3 to 1 wt-%, or 0.5 to 1 wt-%. Additionally or alternately, the amount of pigment added may be, for example, 0.1 to 5 wt-% of the wetted sand, 0.2 to 2 wt-% of the wetted sand, 0.3 to 1 wt-%, or 0.5 to 1 wt-% of the wetted sand. The pigment may be added slowly over time or may be added as a single addition (as a batch).

Examples of suitable pigments include iron oxide, iron oxide hydroxide, carbon black, magnetitite, maghemite, hematite, chromium oxide, titanium dioxide, cobalt blue, phthalo blue, phthalocyanine blue, phthalocyanine green. Mixtures of two or more pigments can be used, in any ratios. The pigment can be any of the thousands that are commercially available from suppliers such as Davis Colors, Prism Pigments, Solomon, Lanxess, and Butterfield, for example.

In operation 206, the pigment is thoroughly mixed with the wetted or dampened sand. As illustrated in FIG. 1, the pigment may be applied over the entire surface of the sand or only a portion thereof, and may be applied as a monolayer or as multiple layers; the surface coverage and the thickness of the pigment coating is related to the amount of pigment added to the sand. In some embodiments, the mixing of operation 206 may occur as the pigment is being added to the sand in operation 204.

In operation 208, polymeric material is added to the colored sand from operation 206. The polymeric material can be a solid (e.g., powered or particulate) material or may be in liquid form; a liquid polymeric material is more easily thoroughly distributed throughout the colored sand.

The polymeric material can be either a thermoplastic or a thermoset polymer, but typically, a thermoset material is used. The polymeric materials may be moisture curable, heat curable, UV or other radiation curable, for example. Examples of suitable polymeric materials include phenolic resins, aminoplast resins having pendant $\alpha,\beta$-unsaturated carbonyl groups, urethane resins, urea-formaldehyde resins, epoxy resins, fluorene modified epoxy resins, ethylenically-unsaturated resins, acrylics or acrylated resins such as acrylated isocyanurate resins, acrylated urethane resins, acrylated epoxy resins, isocyanurate resins, bismaleimide resins, and mixtures thereof. Two particular examples of suitable polymeric material are "Joncryl 1907" and "Joncryl 2970", both acrylate-based materials commercially available from BASF.

The amount of polymeric material added to the colored wetted sand is at least 0.05 wt-%. The amount of polymeric material added to the colored wetted sand is no more than 10 wt-%. The amount of polymeric material added may be, for example 0.1 to 5 wt-% of the dry sand, for example, 0.1 to 2 wt-%, 0.3 to 1 wt-%, or 0.5 to 1 wt-% of the dry sand. Additionally or alternately, the amount of polymeric material added may be, for example 0.1 to 5 wt-% of the colored wetted sand, for example, 0.2 to 2 wt-%, 0.3 to 1 wt-%, or 0.5 to 1 wt-% of the colored wetted sand.

In some embodiments, solvent may be added in conjunction with the polymeric material to facilitate dispersal of the polymeric material throughout the colored wetted sand and to enhance the adhesive quality of the resulting colored polymeric coating. The solvent may be added together with, prior to, or subsequent to the polymeric material. Examples of suitable solvents include aqueous and non-aqueous solvents, such as water, acetone, alcohols, and ethers (e.g., glycol ethers) such as dipropylene glycol(mono)methyl ether (DPM), dipropylene glycol n-butyl ether (DPNB), propylene glycol methyl ether (e.g., "Dowanol PM") and propylene glycol methyl ether acetate (e.g., "Dowanol PMA"). In some embodiments, a solvent with a low vapor pressure is selected, to facilitate drying of the polymeric material in subsequent steps, for example, if no or low heating is used.

In operation 210, the polymeric material is thoroughly mixed throughout the sand and, if the polymeric material was liquid, allowed to dry. To facilitate the drying, the sand may be warmed and/or air may be blown into the sand; adding heated (hot) air is an efficient drying procedure. As an example, the material may be heated to 100 to 120 degrees F., although cooler or warmer/hotter temperatures can be used. As another example, hot air at a temperature of 120-150 degrees F. may be blown into the mixing (tumbling) sand.

In operation 212, a second coating or layer of polymeric material is applied over the dry, already-coated polymeric material; this second coating or layer may be discontinuous over the first polymeric coating. This second coating or layer of polymeric material increases the thickness of the polymer(s) retaining the color on the sand, and increases the abrasion-resistance of the resulting particle. The second coating or layer may be the same as or different than the first layer, from operation 208. That is, the polymeric material, the coating weight, the method of applying, etc. may be the same as or different than the first layer, from operation 208. Typically, however, the coating weight of the second polymeric material is greater than the coating weight of the first polymeric material, for example, 2× greater, 5× greater, 10× or 15× greater, and in some embodiments 20× greater. In some embodiments, a dry polymeric material having a dissolvable or water-soluble coating (e.g., a colloidal coating) thereon is preferred. Examples of particular suitable polymeric materials for the second polymeric material are "Elotex MP2100" and "Elotex MP2701", both copolymers of vinyl acetate+ethylene and commercially available from AkzoNobel, and powered acrylic or acrylic-containing material(s). Psyllium may be used in addition to or alternately with the polymeric material(s).

The amount of second polymeric material added to the colored sand is at least 0.1 wt-%. The amount of polymeric material added to the colored sand is no more than 50 wt-%, but usually no more than 25 wt-%. The amount of polymeric material added may be, for example 1 to 25 wt-% of the sand, for example, 2 to 20 wt-%, 5 to 10 wt-% of the sand.

In operation 214, the second coating or layer of polymeric material is thoroughly mixed throughout the sand. This mixing may be under the same or different conditions than operation 210.

To facilitate the process 200 and minimize the equipment used, two or all of the operations (i.e., wetting operation 202, the pigment application operation 204, the mixing operation 206, the polymer application operation 208, etc.) can be done in the same mixer (e.g., a paddle mixer, cement mixer, drum mixer, "Hobart"-type mixer, ribbon-blend mixer), although separate vessels could alternately be used. A rotary mixer, such as a drum mixer, paddle mixer or cement mixer, provides a tumbling action that thoroughly and evenly distributes the pigment, the liquid and/or the polymeric material throughout the sand. Additionally, hot air can readily be blown into a drum mixer or rotary mixer, during rotation of the mixer.

Figure 3:
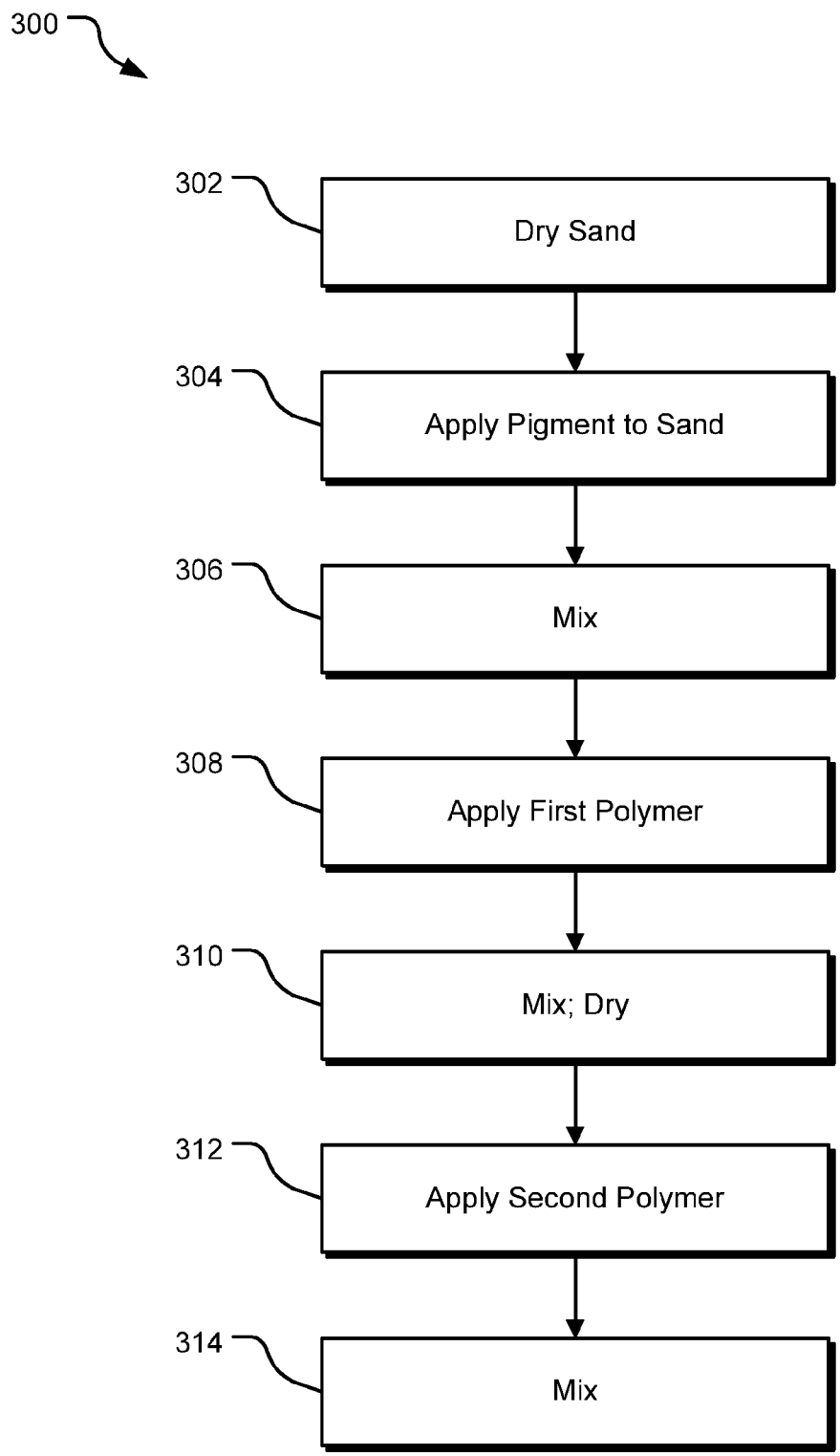
FIG. 3 is a flow diagram of another exemplary method of making colored polymeric sand.

FIG. 3 illustrates another exemplary process 300 for forming colored polymeric sand. The various features of process 300 are the same as or similar to the features of process 200, described above, unless indicated otherwise.

In operation 302, dry sand is provided.

In operation 304, pigment is added to the sand, either as dry pigment or liquid pigment. The liquid pigment can be, e.g., a dispersion, suspension or a solution; the solvent in the liquid pigment can be aqueous (e.g., water), inorganic or organic. The amount of pigment added may be, for example, 0.05 to 7 wt-% of the dry sand, 0.1 to 5 wt-%, 0.3 to 2 wt-%, or 0.5 to 1 wt-%. The pigment may be added slowly over time or may be added as a single addition (as a batch).

In operation 306, the pigment is thoroughly mixed with the sand. In some embodiments, the mixing may occur as the liquid pigment is being added.

In operation 308, liquid polymeric material is added to the colored sand from operation 306. Solvent may be preset in the liquid polymeric material or may be added in conjunction with the polymeric material to facilitate dispersal of the polymeric material throughout the colored sand. The solvent may be added together with, prior to, or subsequent to the polymeric material. Particular suitable polymeric materials include "Joncryl 1907" and "Joncryl 2970", acrylate-based materials commercially available from BASF. Examples of particular suitable solvents are dipropylene glycol(mono) methyl ether (DPM) and dipropylene glycol n-butyl ether (DPNB).

In operation 310, the polymeric material is thoroughly mixed throughout the sand and allowed to dry or is dried.

In operation 312, a second coating or layer of polymeric material is applied over the dry, already-coated polymeric material; this second coating or layer may be discontinuous over the first polymeric coating. Examples of particular suitable polymeric materials for the second polymeric material are "Elotex MP2100" and "Elotex MP2701", both copolymers of vinyl acetate+ethylene and commercially available from AkzoNobel, and powered acrylic or acrylic-containing material(s). Psyllium may be used in addition to or alternately with the polymeric material(s).

In operation 314, the second coating or layer of polymeric material is thoroughly mixed throughout the sand.

In an alternate method, applicable to either method 200 of FIG. 2 or method 300 of FIG. 3, the polymeric material may be combined with the pigment and applied to the sand (e.g., wetting sand) in a single step. In such an application, the pigment is dispersed (e.g., homogenously) throughout the polymeric material.

In one particular example, a colored polymeric sand product, with iron oxide and/or carbon-based pigments, can be made by the following general procedure:

(1) Place paver-type sand (e.g., masonry sand) into a cement or paddle style mixer. The temperature of the sand should be at least 50 degrees F. or higher.

(2) Add 0.25 to 0.50 wt-% water to the sand and mix in thoroughly. Although not required, an additive may be added to reduce the formation of dust; typically, however, the water is sufficient for dust control.

(3) Add 0.5 to 1.0% dry pigment or liquid colorant to the sand; the dry pigment or liquid colorant is iron oxide and/or carbon based. Mix thoroughly until the sand is completely colored.

(4) Add 0.50 to 1.0 wt-% liquid or dry acrylic-type polymer. If dry polymer is used, add an additional 0.50-1.0 wt-% water in step (2). Mix sand, color and polymer thoroughly until dry. Applying heat and air during the mixing process will help to accelerate the drying process.

(5) Once the colored sand with binder is dry, add 2-10 wt-% dry copolymer (depending on recommended paver gap) of vinyl acetate and ethylene and mix in thoroughly. An optional 0.50 to 1.0 wt-% dry Portland cement may be added to boost the pH level of the product and maximize polymer efficiency.

(6) The colored polymeric sand can be packaged in super sacks or 50 lb bags.

The resulting colored polymeric sand product can be used in applications where as polymeric sand can be conventionally used, such as between pavers and bricks, but the colored polymeric sand provides a higher aesthetic appeal than uncolored sand.

Thus, various features of a colored, polymeric coated sand and methods of making the sand have been described. The above specification provides a complete description of the structure and use of exemplary implementations of the invention. The above description provides specific implementations. It is to be understood that other implementations are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about." Accordingly, unless indicated to the contrary, any numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above", "on top", "on," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A method of making a colored polymeric sand, the method comprising:
   mixing a pigment onto sand to form colored sand;
   applying an acrylate-based polymeric coating on the colored sand to form a wet acrylate-based coated sand;
   drying the wet acrylate-based coated sand to form a dried acrylate-based polymeric coating; and
   applying a vinyl acetate and ethylene copolymer on the dried acrylate-based polymeric coating.

2. The method of claim 1, wherein all steps of the method are done in one rotary mixer.

3. The method of claim 1, wherein applying an acrylate-based polymeric coating comprises adding 0.1 to 2 wt-% acrylate-based polymeric material to the colored sand and mixing.

4. The method of claim 1, wherein drying the wet acrylate-based coated sand comprises tumbling the colored sand while heating.

5. The method of claim 1, wherein the vinyl acetate and ethylene copolymer comprises a water soluble coating.

6. The method of claim 5, wherein applying a vinyl acetate and ethylene copolymer comprises adding 2 to 10 wt-% vinyl acetate and ethylene copolymer material and mixing.

7. The method of claim 1, wherein applying an acrylate-based polymeric coating comprises applying a liquid acrylate-based polymeric material.

8. The method of claim 1, wherein mixing a pigment onto sand comprises adding liquid pigment to the sand.

9. The method of claim 1, wherein applying an acrylate-based polymeric coating on the colored sand comprises applying a liquid acrylate-based polymeric coating on the colored sand.

10. A method of making a colored polymeric sand, the method comprising:
    mixing a pigment onto sand to form colored sand;
    applying a liquid, acrylate-based polymeric coating on the colored sand;
    drying the acrylate-based polymeric coating; and
    applying a dry vinyl acetate and ethylene copolymer material on the dried acrylate-based polymeric coating.

11. The method of claim 10, wherein all steps of the method are done in one rotary mixer.

12. The method of claim 10, wherein mixing a pigment onto sand comprises wetting the sand and adding pigment to the sand.

13. The method of claim 10, wherein mixing a pigment onto sand comprises adding 0.1 to 2 wt-% pigment to the sand.

14. The method of claim 13, wherein the pigment comprises an iron oxide.

15. The method of claim 10, wherein applying an acrylate-based polymeric coating comprises adding 0.1 to 2 wt-% acrylate-based polymeric material to the colored sand and mixing.

16. The method of claim 10, wherein drying the acrylate-based polymeric coating comprises tumbling the colored sand while heating.

17. The method of claim 10, wherein the vinyl acetate and ethylene copolymer comprises a water soluble coating.

18. The method of claim 10, wherein applying a dry vinyl acetate and ethylene copolymer comprises adding 2 to 10 wt-% vinyl acetate and ethylene copolymer material and mixing.

* * * * *